(12) United States Patent
Todasco

(10) Patent No.: US 9,959,540 B2
(45) Date of Patent: May 1, 2018

(54) SECURITY AUTHENTICATION USING PAYMENT CARD DISPLAY DEVICES AT ACCEPTED MERCHANT LOCATIONS

(71) Applicant: PAYPAL, INC., San Jose, CA (US)

(72) Inventor: Michael Charles Todasco, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 359 days.

(21) Appl. No.: 14/720,659

(22) Filed: May 22, 2015

(65) Prior Publication Data

US 2016/0342990 A1    Nov. 24, 2016

(51) Int. Cl.
| G06Q 40/00 | (2012.01) |
| G06Q 20/40 | (2012.01) |
| G06Q 20/34 | (2012.01) |
| G06Q 20/32 | (2012.01) |
| G06Q 30/02 | (2012.01) |

(52) U.S. Cl.
CPC ......... *G06Q 20/405* (2013.01); *G06Q 20/327* (2013.01); *G06Q 20/3224* (2013.01); *G06Q 20/34* (2013.01); *G06Q 30/0267* (2013.01)

(58) Field of Classification Search
None
See application file for complete search history.

(56) References Cited

U.S. PATENT DOCUMENTS

| 2002/0026416 A1* | 2/2002 | Provinse | G06Q 10/02 705/39 |
| 2004/0039694 A1* | 2/2004 | Dunn | G06Q 20/04 705/39 |
| 2010/0082487 A1* | 4/2010 | Nelsen | G06Q 20/10 705/44 |
| 2012/0030002 A1* | 2/2012 | Bous | G06Q 30/02 705/14.36 |
| 2012/0203698 A1* | 8/2012 | Duncan | G06Q 20/34 705/44 |
| 2014/0081870 A1* | 3/2014 | de Sylva | G06Q 20/40145 705/44 |
| 2014/0129422 A1* | 5/2014 | Zhou | G06Q 40/025 705/38 |
| 2014/0143037 A1* | 5/2014 | Zhou | G06Q 30/0226 705/14.17 |
| 2014/0214500 A1* | 7/2014 | Hudson | G06Q 30/0284 705/13 |

(Continued)

*Primary Examiner* — Rajesh Khattar
(74) *Attorney, Agent, or Firm* — Haynes & Boone, LLP

(57) ABSTRACT

There are provided systems and methods for security authentication using payment card display devices at accepted merchant location. A user may be walking near or visiting a merchant location with a wireless smart payment card which may connect to a wireless beacon at the merchant location. The user's payment card may communicate issuer and type of payment card data when connected with the wireless beacon. The beacon may communicate the user's payment card data to a merchant device or server. The merchant device or server may compare user's payment card data to merchant's accepted payment sources. The merchant device or server may alert user's payment card via communication through the wireless beacon, the payment card is accepted at the merchant location. Additionally, security identification and/or advertisements may be communicated to the user's accepted payment card.

20 Claims, 5 Drawing Sheets

(56) References Cited

U.S. PATENT DOCUMENTS

| | | | |
|---|---|---|---|
| 2014/0239065 A1* | 8/2014 | Zhou | G06F 1/163 235/380 |
| 2015/0149365 A1* | 5/2015 | Mobini | G06Q 20/20 705/75 |
| 2015/0186874 A1* | 7/2015 | Govindarajan | G06Q 20/382 705/65 |
| 2015/0310417 A1* | 10/2015 | Syed | G06Q 20/327 705/39 |
| 2016/0300216 A1* | 10/2016 | Godsey | G06Q 20/325 |

* cited by examiner

US 9,959,540 B2

SECURITY AUTHENTICATION USING PAYMENT CARD DISPLAY DEVICES AT ACCEPTED MERCHANT LOCATIONS

TECHNICAL FIELD

The present application generally relates to proximity detection of devices using wireless communication and more specifically to determining if a payment card is accepted at a merchant location and authenticating the payment card through security messages displayed on the payment card prior to a consumer initiating a purchase transaction.

BACKGROUND

A consumer may be walking past a merchant and spots an item of interest in the merchant's storefront window or associates the merchant with an item the consumer would like to purchase. The merchant may not provide signage identifying all issuers and types of payment cards accepted at that location. The identifying signage may be out of date or obscured by displays or other advertising media. The consumer may spend time in the store to view the item and decide to make a purchase. If the consumer waits in line with the item to make a purchase and during the checkout process is advised the store does not accept the form of payment presented by the consumer, the consumer may be frustrated with both the merchant and the payment card issuer. Moreover, the merchant does not make a sale and may incur additional labor costs in re-stocking the item. Thus, there is no purchase transaction and time is wasted for both the consumer and merchant because of the consumer's lack of advance knowledge with the forms of payment accepted by the merchant. Additionally, if the merchant does accept a preferred card by the user, but the user is not aware that the merchant accepts such card, the user may utilize a less preferable payment method to complete a transaction.

Figure 1:
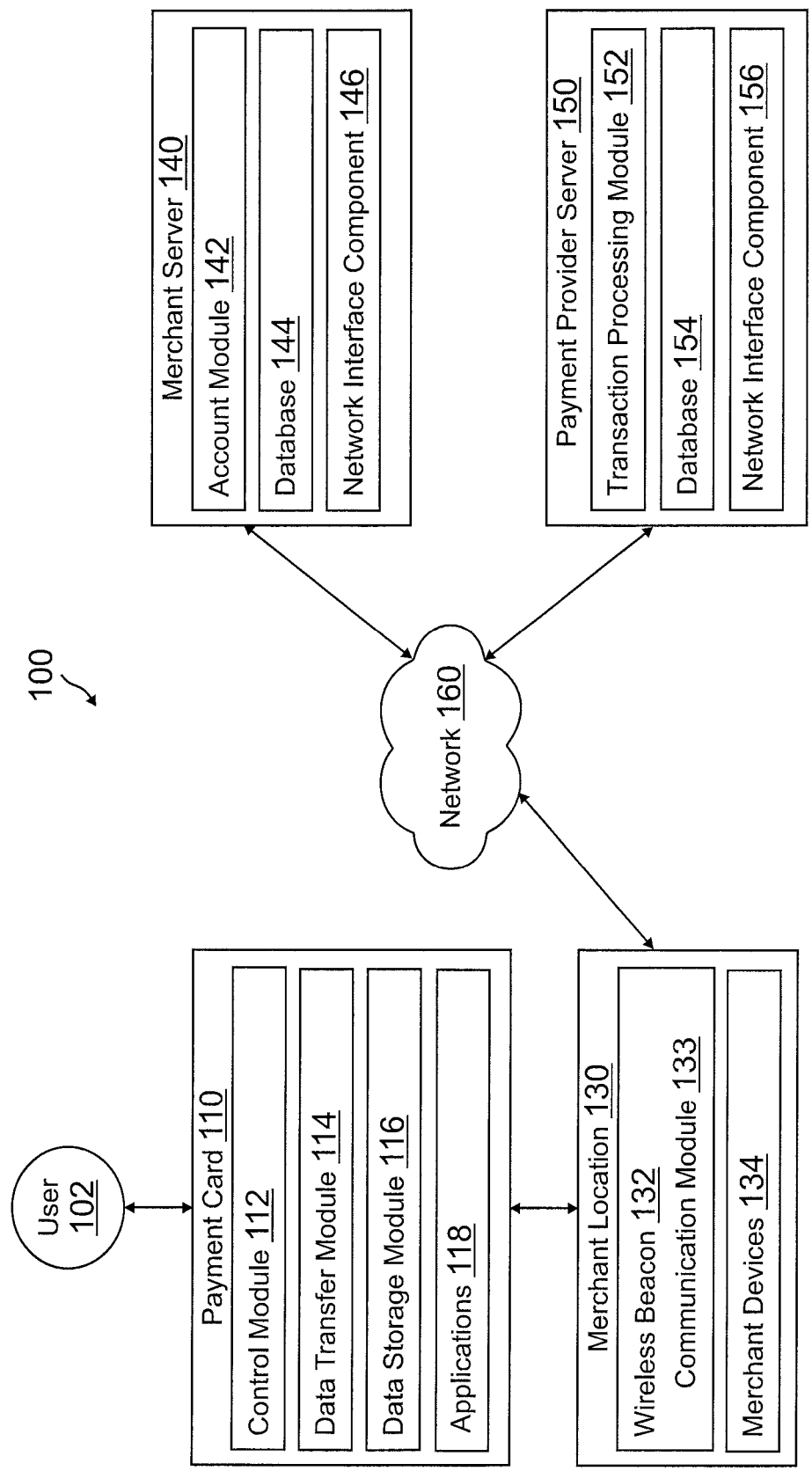
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for security authentication using payment card display devices at accepted merchant location. Systems suitable for practicing methods of the present disclosure are also provided.

Various merchant locations may provide short range wireless communications with users' payment cards, such as through beacons using Bluetooth Low Energy (BLE), LTE Direct, WiFi, or other communications that emit a radio frequency (RF) signal capable of communicating with the user's payment cards. These beacons may be set up at the merchant location, such as at or nearby an entrance to the merchant location, throughout the merchant location and sub-areas of the merchant location (e.g., at sales aisles, booths, or other sub-areas), and/or at checkout counters where a user pays for a transaction. The beacons may communicate with payment cards in possession of users in order to connect to the payment card. The beacons may provide additional functionality, such as establishing a connection with a merchant device or server to provide the merchant device/server notifications of where the payment card is detected. In another embodiment, the wireless beacon may communicate with a user's mobile device and the mobile device may further communicate and connect to the payment card. In this regard, the beacons may provide proximity detection of users and triangulation of user's positions/locations nearby or within the merchant location through the user's mobile device.

When establishing a connection, the beacon may emit a communication signal including an identifier for the beacon, the merchant, and/or a payment provider service administering the beacons. When the payment card detects the signal and authenticates the one or more identifiers, both the payment card and the beacon may ramp up in power and establish a connection, where the connection may further enable the payment card to communicate additional data to the wireless beacon, such as identification data (e.g., issuer and type of payment card). The beacon may be connected to a networked device at the merchant location (e.g., a merchant device, such as a point of sale device or merchant employee networked device), or the beacon may include network functionality to communicate with other devices and/or servers itself. The sophistication of the connection may facilitate separate and discrete connections with multiple payment cards should they be within range of the beacon. Thus, the beacon enables the payment card to establish a connection, authenticate itself and communicate payment card identification data (e.g., issuer and type of payment card) to the merchant device or server.

After the wireless beacon communicates the user's payment card data to a merchant device/server or payment service provider, the merchant and/or payment provider databases may be accessed to provide the issuers and types of payment cards accepted at the merchant location. For example, the merchant may accept Visa®, Discover®, American Express®, PayPal®, and/or Venmo® at a specific merchant location when the user wishes to pay for a transaction. Utilizing the accepted issuers and/or payment cards, the device/server may determine whether the user's payment card data matches any accepted issuers/payment cards data. Further, the user's and merchant payment card data may be compared to determine the number of matches for issuers and types of payment cards. Thus, the user's payment card data may be compared to the merchant location accepted payment card sources data in order to determine if the user's payment card or cards are accepted at the merchant location in order to purchase goods and/or services. The user's payment card data may also be utilized to determine any payment cards and/or issuers for the user's payment card data that are not accepted.

Once the user's payment card or cards are identified as accepted at the merchant location by the merchant server and/or payment service provider, an alert may be communicated through the wireless beacon to each of the accepted payment cards. In various embodiments, an alert may also be communicated to payment cards that are not accepted at the merchant location, or the payment cards that are not accepted may default to an unaccepted state when not receiving an alert of acceptability at a merchant location. The alert would provide notification to the each of the accepted payment cards that it is accepted (or not accepted where applicable) at the merchant location. The alert may be communicated in various message formats. For example, in one embodiment, if the user's payment card contained a light emitting diode (LED), the wireless beacon may communicate a message to activate the LED to turn on in order to notify the user the card is accepted at the merchant location. In another embodiment, the payment card may incorporate an E INK® display, wherein the merchant server and/or payment service provider through the wireless beacon may communicate a message "accepted at XXX" where XXX identifies the merchant, or any similar message indicating acceptance at the merchant location. Thus, the user may be notified through the merchant server and/or payment provider server by a message transmitted through the merchant wireless beacon communicating an alert to the accepted payment card instrument that the payment card is an accepted form of payment for goods and/or services at that merchant location.

A merchant server may determine a user's payment card is accepted at the merchant location. The merchant server may be local to the merchant location or it may be a remote server. In some embodiments, a merchant server contains an account module and a merchant database. Merchant server maintains a merchant database that contains accepted payment sources data and the account module utilizing the merchant database determines if a user's payment card is accepted at the merchant location by comparing user's payment card data to accepted payment sources data. In other embodiments, a payment provider server may determine a user's payment card is accepted at the merchant location. In this regard, the payment provider server maintains the merchant database of accepted payment card sources data as part of a database of the payment provider server. The payment provider server may use a transaction processing module and the merchant database to compare user's payment card data to accepted payment sources data and determine if the user's payment card is accepted at the merchant location.

The merchant server and/or the payment provider server may maintain in their respective databases, other information related to accepted payment sources. Such information may contain incentives, rewards or other features offered for each of the accepted payment sources. These incentives, rewards or other features may be used by the merchant server and payment provider server to suggest a preferred payment card from several of user's payment cards accepted at the merchant location. For example, from several of user's payment cards accepted at the merchant location, preference may be based on rewards offered by issuers of the payment cards or preference may be based on offers by merchants for certain card types.

A merchant employee may be notified a user's payment card is accepted at the merchant location. In this regard, the merchant server and/or the payment provider server may communicate an alert to a merchant device display at the merchant location that the user's payment card is accepted when the user is checking out. The alert communicated to the merchant device display may also contain information related to payment card preference when several of user's payment cards are accepted. For example, a merchant may accept rewards points associated with a particular payment card as credit toward the purchase of an item (e.g., American Express® card rewards points) to aid the user in making a choice of which accepted payment card to use for the purchase transaction. Further, the merchant may offer other discounts or rebates associated with a particular payment card issuer or type of card that may be communicated to the user. The merchant employee may inform the user of the preference information and suggest the preferred payment card be used for the purchase. The merchant server and/or the payment provider server may also communicate a message that reward points redemption is accepted at the merchant location to the particular payment card through a merchant wireless beacon in certain embodiments where the payment card incorporates display technology such as E INK®. Further, where the payment card incorporates display technology such as E INK®, the merchant server and/or the payment provider server may also communicate to the merchant display device, a security code previously transmitted to the accepted payment card. The merchant employee can use the security code information to insure the payment card is valid prior to initiating the purchase transaction by checking the security code is displayed on the payment card.

For example, a security code may be communicated to the payment card, which may be particular to a merchant location, in order to insure that the payment card is authorized for the merchant location based on communications between the security card and a device at the merchant location. Thus, other payment cards not receiving the security message may be flagged as unauthorized for the merchant location. In other embodiments, the security code may be displayed on both the payment card and the merchant device at the merchant location for matching by a merchant employee at the merchant location. However, if the card's code does not match the displayed code on the merchant device, the card may be flagged as unauthorized or fraudulent. Thus, if a card is reported as stolen or unauthorized for certain transactions, locations, uses, etc., the card may display a different message (determined by the merchant's device/server or a payment provider server servicing the payment card) so that the merchant employee is aware the card should not be used (and may enable the merchant/merchant employee to contact an authority entity).

Payment providers may also insure security of the payment cards by including specialized hardware and/or software (e.g., an antenna responsive only at certain frequencies and/or a processor and associated hardware to having encryption/decryption keys/algorithms) which may receive specialized communications (e.g., tokens) at the merchant location. Valid cards by the payment providers may be responsive to these specialized communications. Thus, a merchant may protect from fraud by insuring that payment cards accepted by a merchant/merchant employee are responsive to these communications. For example, a certain frequency communication at the merchant location for accepted payment cards may cause an LED to light up or turn a certain color in response to the communications, or an E INK® to display a certain message. In other embodiments, the card may decrypt a token having an encoded message and display the message on a display of the card. The merchant/merchant employee may receive a security communication from the payment provider that details the type of secure response that the cards should have if the card is a valid card issued by the payment provider. Thus, the merchant/merchant employee may match the cards response to the security message and confirm whether the card is a valid card for use at the merchant location and with the payment provider.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a payment card 110, a merchant location 130 having wireless beacons 132 and merchant device 134, a merchant server 140, and a payment provider server 150 in communication over a network 160. User 102 may travel to merchant location 130 with payment card 110 in order to shop for one or more items. While at merchant location 130, one or more wireless beacons 132 may connect to payment card 110 and effectuate a data transfer to merchant location 130, for example, by receiving payment card 110 identification data (e.g., issuer and type of payment card). Wireless beacons 132 may then communicate the payment card 110 identification data to merchant server 140 over network 160. Merchant server 140 may access database 144 to retrieve merchant accepted payment sources and process a comparison of the payment card 110 identification data to merchant accepted payment sources data in order to determine if there is a match. Merchant server 140 may then communicate a message (e.g., an alert) through a network interface component 146 over network 160 and through the merchant wireless beacon 132 to the user's payment card 110 indicating the payment card is an accepted form of payment for goods and/or services at that merchant location for those user's payment cards that match the merchant's accepted payment card sources.

Payment card 110, wireless devices 132, merchant devices 134, merchant server 140, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Payment card 110 of FIG. 1 contains a control module 112, a data transfer module 114, a data storage module 116, and an applications module 118. Control module 112 and applications module 118 may correspond to executable processes, procedures, and/or applications with associated hardware. In other embodiments, payment card 110 may include additional or different hardware and software as required.

Payment card 110 may be implemented as a contactless smart card capable of transferring and receiving data using a near field communications capability for communication with wireless beacons 132 or other wireless protocol devices (e.g., a smart phone). Payment card 110 may include a control module 112 (e.g., a microprocessor, processor element, or other logic element) that is configured to execute data processing operations for data stored in the payment card's data storage module 116. Data transfer module 114 is utilized to exchange data between payment card 110 and wireless beacon 132 or other data transfer elements. Payment card 110 may also contain an applications module 118 to perform general purpose applications such as to retrieve data from storage or as in certain embodiments, applications such as to power and control an E-INK® display integrated into the payment card. Although a payment card is shown operationally connected to the merchant server 140 through the merchant wireless device 132, the payment card may be managed or controlled by any suitable processing device such as a user's mobile device (e.g., a smart phone, wristwatch with appropriate computer hardware resources, other type of wearable computing device, implantable communication devices, and/or other types of computing devices capable of transmitting and/or receiving data, such as an IPAD® from APPLE®). Although only one payment card is shown, a plurality of payment cards may function similarly.

Merchant location 130 may correspond to a physical location that a user (e.g., user 102) may visit in order to purchase one or more items in a transaction. In this regard, merchant location 130 may correspond to a retail storefront or other type of location where one or more items are provided to purchase. User 102 may visit merchant location 130 in order to purchase the item(s). Merchant location 130 may correspond to a single merchant or may correspond to a plurality of merchants, such as a shopping mall. Although one merchant location is shown, a plurality of merchant locations may include similar functionality as described herein. Additionally, although merchant server 140 is shown as a server remote from merchant location 130, in other embodiments the described processes and functions of merchant server 140 may be included in one or more of merchant devices 134 that are local to merchant location 130.

Merchant location 130 of FIG. 1 includes merchant devices 134 and wireless beacons 132. Merchant devices 134 may be maintained, for example, by a merchant corresponding to merchant location 130 and/or merchant server 140, which may offer one or more items for purchase through merchant location 130. In this regard, merchant devices 134 include one or more processing applications which may be configured to interact with payment card 110, merchant server 140, and/or payment provider server 150 to facilitate generation of a transaction and payment to the merchant for the transaction. In various embodiments, merchant devices 134 may also correspond to devices offering online sale of items, which user 102 may purchase while at merchant location 130. For example, merchant devices 134 may be provided by EBAY®, Inc. of San Jose, Calif., USA or STUBHUB®, Inc. of San Francisco, Calif. However, in other embodiments, merchant devices 134 may be maintained by or include any merchant, including merchants that offer offline sales of items through merchant location 130. In such embodiments, merchant device may be implemented as a personal computer (PC), a smart phone, laptop computer, wristwatch with appropriate computer hardware resources, eyeglasses with appropriate computer hardware (e.g. GOGGLE GLASS®) and/or other types of computing devices capable of transmitting and/or receiving data, such as an IPAD® from APPLE®. Moreover, in various embodiments, one or more of the applications, processes, and/or features discussed below in reference to merchant server 140 may be included in one or more of merchant devices 134.

Wireless beacons 132 may be maintained, for example, by a merchant (e.g., the merchant associated with merchant location 130/merchant server 140) and/or payment provider (e.g., payment provider server 150) offering account services such as payment source data to the merchant associated with merchant location 130/merchant server 140. Wireless beacons 132 may be implemented using any appropriate hardware and software configured for wireless communication with payment card 110, merchant devices 134, and/or merchant server 140. For example, in one embodiment, wireless beacons 132 may be implemented as a dongle device including a hardware processor and a communication module, for example, connected to a device at merchant location 130 (e.g., one or more of merchant devices 134). Wireless beacons 132 may also be implemented as a device incorporated within a personal computer (PC), a smart phone, laptop computer, and/or other types of computing devices capable of transmitting and/or receiving data, such as an IPAD® from APPLE®. Wireless beacons 132 may also act as a stand-alone device including a processor, communication module, and/or network interface component configured to communicate with payment card 110, merchant devices 134, and/or merchant server 140. Although a plurality of wireless beacons are described, a single wireless beacon may be utilized at merchant location 130.

Wireless beacons 132 may be located at and throughout merchant location 130 (e.g., at an entrance, exit, sub-area, and/or checkout/payment location). Wireless beacons 132 of FIG. 1 contain processes, procedures, and/or applications, for example, a software program, executable by a hardware processor configured to interact with payment card 110, merchant devices 134, and/or merchant server 140. Thus, regardless of the implementation of wireless beacons 132, as discussed above, each of wireless beacons 132 utilize a communication module. The communication module may correspond to executable processes, procedures, and/or applications with associated hardware. In other embodiments, wireless beacons 132 may include additional or different software and devices as required.

The communication module may correspond to an executable module having specialized hardware and/or software features for transmitting requests to establish a connection between a device (e.g., payment card 110) and one of wireless beacons 132 transmitting the request to establish the connection. Thus, wireless beacons 132 may utilize short range wireless communications of wireless beacons 132 to transmit the requests to establish a connection, including an identifier such as a Universally Unique Identifier (UUID). If payment card 110 receives a request to establish the connection with wireless beacons 132 and responds with a payment card identifier (potentially including the UUID and other information necessary to effectuate communication with payment card 110), the communication module may cause payment card 110 to ramp up in power and create a connection between payment card 110 and wireless beacons 132.

Each of wireless beacons 132 may transmit the request to establish the connection with wireless beacons 132 as a short range wireless communication (e.g. a BLE protocol communication) including a "wake up" process for payment card 110. In other embodiments, the request and/or connection may utilize near field communication, radio communication, infrared communication, Bluetooth communication, or WiFi communication. Additionally, although wireless beacons 132 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 132 (e.g., payment card 110) and establishment of a connection for data transfers.

After the communication module receives payment card data (e.g., issuer and payment card type) from payment card 110, the beacon of wireless beacons 132 that connected to payment card 110 may pass the payment card data to merchant server 140 using the communication module. The payment card data may allow merchant server 140 to determine if payment card 110 is accepted at the merchant location 130. Additionally, the communication module may cause wireless beacons 132 to keep a communication channel open with payment card 110 for passing additional information between payment card 110, merchant devices 134, and/or merchant server 140.

In other embodiments, the user's payment card 110 may include an RFID or similar passive device to receive certain frequency communications that are associated with a particular payment card/issuer (e.g., a Visa card containing an RFID tag responsive at Visa's set frequency). If a merchant's wireless beacon 132 is programmed to continuously broadcast an "accepted card" at the certain frequency of a particular payment card/issuer (or any other type of communication causing a response with a passive RFID tag), then when the user's payment card 110 associated with the particular payment card/issuer is in range of the beacon set up at the merchant location 130, the card may respond by activating an LED contained on the payment card 110 to turn on. The activated LED would inform the user that the payment card 110 is accepted at the merchant location 130.

In yet another embodiment, the communication module may communicate with a user's mobile device (e.g., a smart phone, wristwatch with appropriate computer hardware resources, other type of wearable computing device, implantable communication devices, and/or other types of computing devices capable of transmitting and/or receiving data, such as an IPAD® from APPLE®) when the user's device is detected in proximity of the merchant location by wireless beacon 132. The user's mobile device may communicate payment card 110 issuer and type of payment card data to wireless beacon 132. After wireless beacon or merchant device communicates to user's device payment card 110 is accepted, user's device may communicate to payment card 110 to initiate a response for example, by activating an LED.

In various embodiments, each of wireless beacons 132 include at least one communication module adapted to communicate with payment card 110, merchant devices 134, and/or merchant server 140. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module may communicate with payment card 110 using short range communications, such as radio frequency, infrared, Bluetooth, and near field communications.

Merchant server 140 may be maintained, for example, by a merchant that accepts payment cards. In this regard, merchant server 140 includes one or more processing applications which may be configured to interact with merchant devices 134, wireless beacons 132, and/or payment provider server 150 to provide accepted payment card sources data. Merchant server 140 may correspond to a server administering merchant location 130 where one or more payment cards may be accepted as a form of payment at that merchant location. Additionally, merchant server 140 may provide online sale of items. For example, merchant device 130 may be provided by EBAY®, Inc. of San Jose, Calif., USA or STUBHUB®, Inc. of San Francisco, Calif. However, in other embodiments, merchant server 140 may correspond to any online and/or offline merchant. Although a single merchant server is shown, a plurality of merchant servers may function similarly. Additionally, although merchant server 140 is shown as a server remote from merchant location 130, in other embodiments the described processes and functions of merchant server 140 may be included in one or more of merchant devices 134 that are local to merchant location 130.

Merchant server 140 of FIG. 1 includes an account module 142 and a network interface component 146. Account module 142 may correspond to executable processes, procedures, and/or applications with associated hardware. In other embodiments, merchant server 140 may include additional or different modules having specialized hardware and/or software as required. Although the below described hardware and features are discussed in reference to a merchant server remote from merchant location 130, in various embodiments, such hardware and features may correspond to and be executed by a merchant device, such as one or more of merchant device 134, local to merchant location 130. Moreover, in various embodiments, payment provider server 150 may provide similar features to those discussed below.

An account module 142 comprises at least one hardware processor that accesses a payment card data received by a wireless beacon 132 when the payment card 110 signally connects to the wireless beacon 132 at a merchant location 130 for a merchant, accesses at least one accepted payment sources data for the merchant, determines at least one matching data from the payment card and the at least one accepted payment sources, and alerts at least one of the payment card and a merchant device 134 at the merchant location based on the at least one matching data. Account module 142 may correspond to one or more processes to execute modules and associated specialized hardware of merchant server 140 to provide and manage accepted payment card accounts for a merchant associated with merchant location 130/merchant server 140. In this regard, account module 142 may correspond to specialized hardware and/or software utilized to establish and maintain at least one accepted payment sources data for merchant 130. In various embodiments, account module 142 may also receive payment card 110 identification data (e.g., issuer and type of payment card) to establish if payment card 110 is accepted at the merchant location 130.

For example, while at merchant location 130, one or more wireless beacons 132 may connect to payment card 110 or user's mobile device and effectuate a data transfer to merchant location 130 by receiving payment card 110 identification data (e.g., issuer and type of payment card). Wireless beacons 132 may then communicate the payment card 110 identification data to account module 142 over network 160. Account module 142 may access database 144 to retrieve merchant accepted payment sources data and process a comparison of payment card 110 identification data to merchant accepted payment sources data in order to determine if there is a match. Account module 142 may then communicate a message (e.g., an alert) through a network interface component 146 over network 160 and through the merchant wireless beacon 132 to the user's payment card 110 and/or user's device indicating the payment card is an accepted form of payment for goods and/or services at that merchant location for those user's payment cards that match the merchant's accepted payment card sources. In one embodiment, if the user's payment card contained a light emitting diode (LED), account module may communicate a message to activate the LED to turn on in order to notify the user the card is accepted at the merchant location. In another embodiment, the payment card may incorporate an E INK® display, wherein the merchant server and/or payment service provider through the wireless beacon may communicate a message "accepted at XXX" where XXX identifies the merchant, or any similar message indicating acceptance at the merchant location. Further, in various embodiments, account module 142 may communicate an alert to payment cards that are not accepted at the merchant location, or the payment cards that are not accepted may default to an unaccepted state when not receiving an alert of acceptability at a merchant location.

Once it is determined payment card 110 is accepted, account module 142 may associate accepted payment sources incentives, rewards or other features (e.g., discounts, free/reduced priced items, rebates, special offers, etc.) with the accepted payment card. In various embodiments, account module 142 may also communicate information related to the accepted payment sources incentives, rewards or other features to one or more of user's payment cards 110 through network 160 and wireless beacon 132 in those embodiments of a payment card where payment card incorporates display technology such as, for example, an E-INK® display integrated into the payment card. The communication module may transmit information to payment card 110, such offers, advertisements and/or benefits (e.g., discounts, free/reduced priced items, rebates, special offers, etc.) for user 102 in those embodiments of a payment card where the payment card incorporates display technology.

Further, these incentives, rewards or other features may be used by the account module 142 to determine a preferred payment source from several of user's payment cards accepted at the merchant location. For example, from several of user's payment cards 110 accepted at the merchant location 230, preference may be based on rewards or rebates offered by issuers of the payment cards 110. Preference may be based on the merchant location 230 accepting rewards points associated with a particular payment card 110 as credit toward the purchase of an item (e.g., American Express® card rewards points). Further, a merchant location 230 may make special offers or discounts for certain card types. Account module may compute a preferred payment card based on these aforementioned factors. Account module 142 may communicate a preference to payment card 110 directly for those payment cards incorporating display technology and/or may communicate to a merchant employee through a merchant device 134 display while the user is at the checkout counter in merchant location 130.

In various embodiments, merchant server 140 includes at least one network interface component 146 adapted to communicate to merchant devices 134, wireless beacons 132, and/or payment provider server 150 over network 160. The network interface component 146 communicates the payment card data received by the wireless beacon 132, the at least one accepted payment sources data and the alerts to at least one of the wireless beacon 132 and the merchant device 134 at the merchant location 130. In various embodiments, network interface component 146 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Payment provider server 150 may be maintained, for example, by an online payment service provider, which may provide payment services and/or processing for financial transactions on behalf of users. In this regard, payment provider server 150 includes one or more processing applications which may be configured to interact with payment card 110 (e.g., through wireless beacons 132), merchant devices 134, and/or merchant server 140 to facilitate determination if payment card 110 is an accepted payment card source. In one example, payment provider server 150 may be provided by PAYPAL®, Inc. of San Jose, Calif., USA. However, in other embodiments, payment provider server 150 may be maintained by or include a credit provider, financial services provider, financial data provider, and/or other service provider, which may provide payment services to user 102 and/or the merchant associated with merchant location 130/merchant server 140. Moreover, in various embodiments, one or more of the applications, processes, and/or features discussed below in reference to payment provider server 150 may be included in merchant devices 134 and/or merchant server 140, for example, features and processes offered by a transaction processing module 152. Those features may include a suggestion of a best accepted payment card fit to maximize external factors such as spending rewards or points.

Payment provider server 150 of FIG. 1 includes a transaction processing module 152 and a network interface component 156. Transaction processing module 152 may correspond to executable processes, procedures, and/or applications with associated hardware. In other embodiments, payment provider server 150 may include additional or different modules having specialized hardware and/or software as required.

Transaction processing module 152 may correspond to one or more processes to execute modules and associated specialized hardware of payment provider server 150 to receive and/or transmit information from payment card 110 (e.g., through merchant beacons 132), merchant devices 134, and/or merchant server 140 to determine if user's payment card is accepted at the merchant location. In this regard, transaction processing module 152 may correspond to specialized hardware and/or software to process a received request from merchant devices 134, and/or merchant server 140 by accessing a merchant's accepted payment source data base as part of database 154 of the payment provider server and comparing to user's payment card data. If a match is identified, transaction processing module 152 may communicate, via network interface component, to merchant devices 134, and/or merchant server 140 user's payment card is accepted at merchant location. Further, transaction processing module 152 may be used in conjunction with the merchant server 140 to determine accepted payment sources, such as a payment source specific to the merchant and a payment source offered by the payment provider.

Further, transaction processing module 152 may receive and/or transmit information from payment card 110 (e.g., through merchant beacons 132), merchant devices 134, and/or merchant server 140 for processing and completion of one or more transactions initiated by user 102. In this regard, transaction processing module 152 may process a received transaction from merchant devices 134, and/or merchant server 140 by receiving the transaction from merchant devices 134, and/or merchant server 140 with a payment request for a payment for the transaction. The payment request may correspond to a payment token, including a payment instrument and identification of the transaction, and may be encrypted prior to transmission to transaction processing module 152 to prevent unauthorized receipt of a payment instrument. The payment token may include information corresponding to user identifiers, user financial information/identifiers, transaction information and/or other identifiers. Additionally, the payment token may include a payment amount and terms of payment for the transaction. Once received, transaction processing module 152 may utilize a payment account or financial information (e.g., a payment instrument such as a credit/debit card, bank account, etc.) of user 102 to render payment for the transaction. Payment may be made to merchant devices 134 and/or merchant server 140 using the payment card instrument 110 and the terms of the payment request.

Additionally, payment provider server 150 includes database 154. User 102 and/or the merchant corresponding to merchant location 130/merchant server 140 may establish one or more payment accounts with payment provider server 150. Payment accounts in database 154 may include user/merchant information, such as name, address, birthdate, payment/funding information, additional user financial information, and/or other desired user data. User 102 and/or the merchant may link to their respective payment accounts through a user, merchant, and/or device identifier. Thus, when an identifier is transmitted to payment provider server 150, e.g. from merchant devices 134, and/or merchant server 140, a payment account belonging to user 102 and/or the merchant may be found. In other embodiments, user 102 and/or the merchant may not have previously established a payment account and may provide other financial information to payment provider server 150 to complete financial transactions, as previously discussed.

In various embodiments, payment provider server 150 includes at least one network interface component 156 adapted to communicate with merchant devices 134 and/or merchant server 140 over network 160. In various embodiments, network interface component 156 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
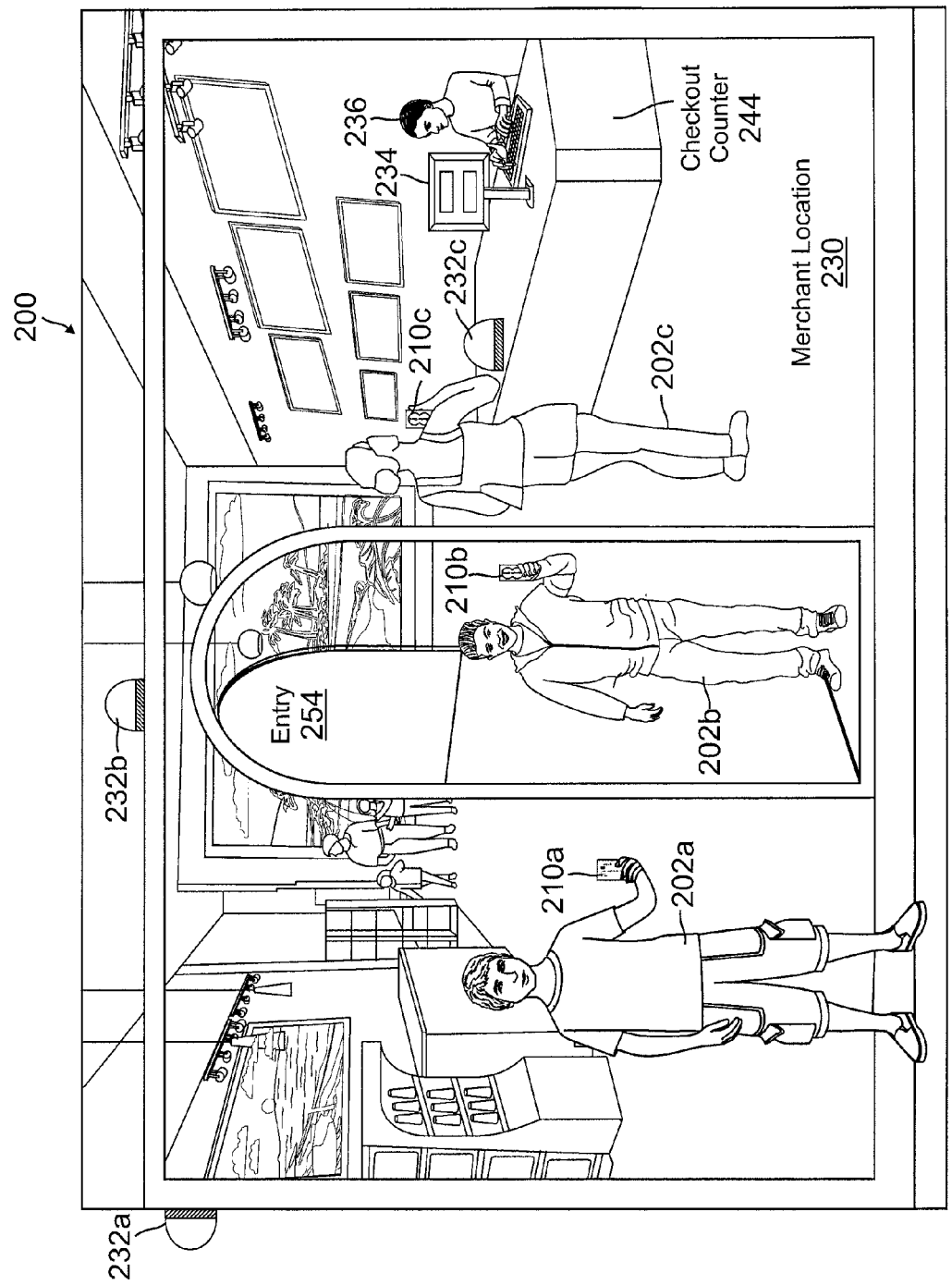
FIG. 2 is an exemplary environment where payment card data is accessed and a communication is provided if the payment card is accepted at the merchant location, according to an embodiment.

FIG. 2 is an exemplary environment where user's payment card data is accessed and a communication is provided if the payment card is accepted at the merchant location, according to an embodiment. Environment 200 of FIG. 2 includes a user 202a having a payment card 210a, a user 202b having a payment card 210b and a user 202c having a payment card 210c corresponding generally to user 102 and payment card 110, respectively, of FIG. 1. Environment 200 also includes a merchant location 230 and merchant wireless beacons 232a, 232b and 232c corresponding generally to merchant location 130 and merchant wireless beacons 132. Additionally, environment 200 includes a merchant device 234 corresponding generally to merchant device 134 of FIG. 1.

Immediately outside merchant location 230 in environment 200, user 202a may be walking past merchant location 230. When walking past merchant location 230, wireless beacon 232a may detect user, such as user 202a, by connecting with payment card 210a in possession of user 202a. For example, as user 202a walks past merchant location 230, payment card 210a and wireless beacon 234a may pair and form a connection. Payment card 210a may then transmit payment card data (e.g., issuer and type of payment card) to wireless beacon 232a, which may utilize a communication module or merchant device 234 to transmit the payment card data to a merchant server (not shown). Other methods of connection and communication as discussed herein may be used.

As discussed herein, the merchant server may then access accepted payment card sources data and may use the accepted payment card sources data to determine if payment card 210a is accepted at merchant location 230. An alert may be communicated through the wireless beacon 232a to payment card 210a that the payment card is accepted as a form of payment at merchant location 230. In one embodiment, the wireless beacon may alert the user by communication of a message to payment card 210a to activate an LED contained on payment card 210a to turn on. In another embodiment, wireless beacon 232a may alert the user by communication of a message to payment card to activate an E-INK® display to display a message "accepted at XXX" where XXX identifies merchant location 230. Thus, user 202a may be informed prior to entering merchant location 230 payment card 210a is an accepted form of payment.

Further, user 202b may be entering merchant location 230 to shop for one or more items. When arriving at merchant location 230 through entry 254, wireless beacon 232b may detect user, such as user 202b, by connecting with payment card 210b in possession of user 202b. For example, as user 202b enters merchant location 230 through an entry 254, payment card 210b and wireless beacon 232b may pair and form a connection. User payment card 210b data, merchant accepted payment card sources, determination if the payment card 210b is accepted and payment card alerts may be provided for in a similar manner as discussed for payment card 210a above. Thus, user 202b may be informed upon entering merchant location 230 payment card 210b is an accepted form of payment.

In another embodiment of the disclosure, a security message may be displayed on a payment card that incorporates an E-INK® display. The security message may provide notice to a merchant employee 236 the payment card is valid prior to start of a payment transaction. For example, user 202c may be in the merchant location 230 check-out line waiting to make a purchase using payment card 210c. Payment card 210c may connect with wireless beacon 232c. User payment card 210c data, merchant accepted payment card sources, determination if the payment card 210c is accepted and payment card alerts may be provided for in a similar manner as discussed for payment card 210a above. As part of the message alert informing user 202c that payment card 210c is an accepted form of payment, wireless beacon 232c may communicate a security identifier unique to merchant location (e.g., a logo, a picture, a custom message or numeric identifier) to display on payment card 210c. Merchant employee 236 may be informed of the content of the security message through merchant device 234. Thus, when user 202c approaches a checkout counter 244 to complete a transaction with a merchant employee 236, merchant employee 236 may determine whether the transaction may proceed based on the security information displayed on payment card 210c. If the security message displayed on the payment card does no match the message on the merchant device 234, merchant employee 236 may require user identification and/or authentication for the transaction. Or, alternatively, merchant employee 236 may refuse to process the transaction.

Additionally, the security message may be matched manually by merchant employee 236, or may be communicated wirelessly from payment card 210c to merchant device 234. For example, merchant employee 236 may scan payment card 210c to receive the security message from payment card 210c to match to a received security message used to determine if payment card 210c is valid. In other embodiments, payment card 210c may communicate the security message to a wireless beacon at the merchant location. A security message communicated to payment card 210c and required to be matched to a received security message on merchant device 234 may also be time and/or location based. Thus, when payment card 210c is removed from the merchant location where payment card 210c has received a security message used to match to a security message on merchant device 234 by merchant employee 236, payment card 210c's security message may become no longer valid. Moreover, the matching security message communicated to merchant device 234 may change as the user leaves the location, a checkout line of the location, and/or checks-out or otherwise no longer identifies with the merchant location.

Figure 3:
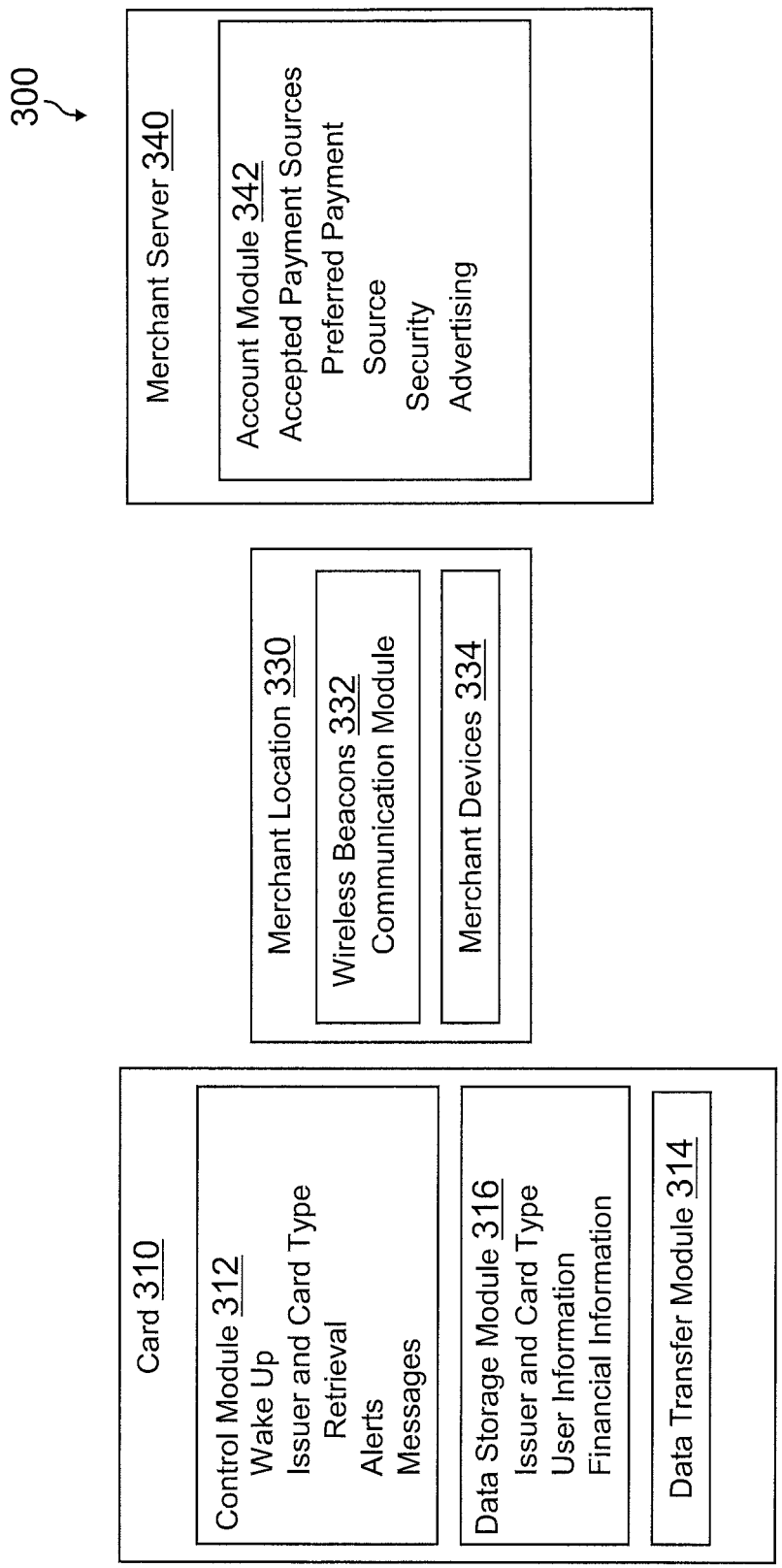
FIG. 3 is an exemplary system environment having a payment card providing issuer and type of payment card data and determining if the user's payment card is accepted at the merchant location, according to an embodiment.

FIG. 3 is an exemplary system environment having a user's payment card providing issuer and type of payment card data and determining if the user's payment card is accepted at the merchant location, according to an embodiment. Environment 300 of FIG. 3 includes a payment card 310 corresponding generally to payment card 110, a merchant location 330 corresponding generally to merchant location 130 and a merchant server 340 corresponding generally to merchant server 140, respectively, of FIG. 1.

Payment card 310 executes a control module 312 corresponding generally to the specialized hardware and/or software modules and processes described in reference to control module 112 of FIG. 1. In this regard, control module 312 may be utilized to connect to one or more beacons and present payment card issuer and type of payment card data to the merchant location 330 and/or merchant server 340. As shown in environment 300, control module 312 executes the function to "wake up" payment card 310 when in proximity of wireless beacon 332. Control module, upon request from wireless beacon 332, retrieves issuer and card type data from data storage module 316 and transfers such data via data transfer module 314 to merchant devices 334 and/or merchant server 340 through wireless beacon 332.

Control module 312 further executes alerts and messages corresponding generally to the specialized hardware and/or software modules and processes described in reference to control module 112 of FIG. 1. In this regard, control module receives alerts and message requests from wireless beacon 332 to execute alerts and messages originating from merchant devices 334 and/or merchant server 340. In some embodiments of payment card 310, alerts may be directed to control module 312 to activate an LED contained on the payment card to turn on after it has been determined payment card is accepted at merchant location 330. In other embodiments of payment card 310, messages are directed to control module to display an advertisement or security identifier as discussed herein. Control module includes an antenna capable of short range wireless communications, such as communication with devices that emit a radio frequency (RF) signal capable of communicating with the payment card. In some embodiments, a device is a wireless beacon using Bluetooth Low Energy (BLE), LTE Direct, WiFi, or other near field RF communications. In some implementations, user's payment card 110 may include an RFID or similar passive device to receive certain frequency communications that are associated with a particular payment card/issuer and wireless beacons may be programmed to emit the particular payment card/issuer frequency. Further, some payment cards may be implemented with low power requirements. Such payment cards include responsive hardware that only power up and respond to received communications. Not all implementations of payment cards contain displays. Some implementations that do contain displays are a type where the screen is retained after power sources are removed to decrease power requirements.

Payment card 310 further executes a data storage module 316 corresponding generally to the specialized hardware and/or software modules and processes described in reference to data storage module 116 of FIG. 1. Data storage module contains payment card 310 issuer and type of payment card data and other information such as user and financial information. Further, data storage module may contain APIs and/or specialized applications such as, for example, to operate LEDs and/or displays of payment card 310.

Merchant location 330 executes wireless beacons 332 and merchant devices 334 corresponding generally to the specialized hardware and/or software modules and processes described in reference to wireless beacons 132 and merchant devices 134, respectively, of FIG. 1.

Wireless beacons 332 execute a communication module. If payment card 310 receives a request to establish the connection with wireless beacons 332 and responds with a payment card identifier, the communication module may cause payment card 310 to ramp up in power and create a connection between payment card 310 and wireless beacons 332. Communication module may then request payment card data from payment card 310.

After the communication module receives payment card data (e.g., issuer and payment card type) from payment card 310, the beacon of wireless beacons 332 that connected to payment card 310 may pass the payment card data to merchant server 340 using the communication module. Additionally, the communication module may cause wireless beacons 332 to keep a communication channel open with payment card 310 for passing additional information between payment card 310, merchant devices 334, and/or merchant server 340.

Merchant server 340 executes an account module 342 corresponding generally to the specialized hardware and/or software modules and processes described in reference to account module 142 of FIG. 1. In this regard, account module 342 may be utilized to store merchant location 330 payment card sources and data. Payment card sources data may be accessed by account module 342 and subsequently matched to payment card 310 data at the request of merchant devices 334 and/or wireless beacons 332. In some embodiments, network 160 may be utilized for two way communications between merchant location 330 and merchant server 340.

Account module 342 may also transmit information to payment card 310, such as offers, advertisements and/or benefits (e.g., discounts, free/reduced priced items, rebates, special offers, etc.) for user 102 in those embodiments of a payment card where payment card incorporates display technology such as, for example, an E-INK® display. Further, account module may transmit a security message to be displayed on a payment card that incorporates an E-INK® display. The security message may provide notice to a merchant employee 236 (e.g., logo, picture, custom message or unique identifier) the payment card is valid prior to start of a payment transaction.

Figure 4:
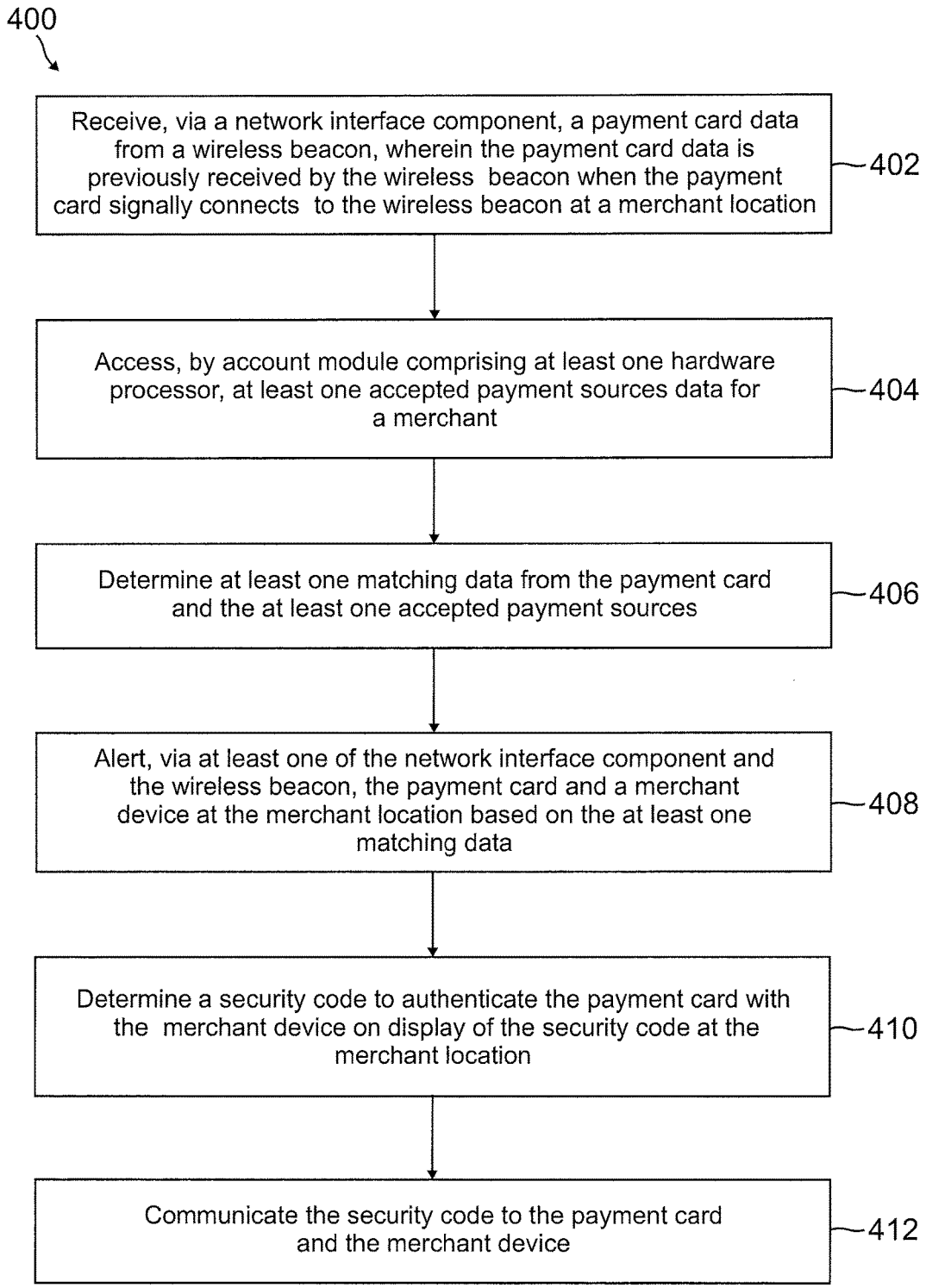
FIG. 4 is a flowchart of an exemplary process for accessing payment card data, determining if a user's payment card is accepted at a merchant location and alerting the user if the payment card is accepted, according to an embodiment.

FIG. 4 is a flowchart of an exemplary process for accessing payment card data, determining if a user's payment card is accepted at a merchant location and alerting the user if the payment card is accepted, according to an embodiment. Note that one or more steps, processes, and methods described herein may be omitted, performed in a different sequence, or combined as desired or appropriate.

At step 402, payment card data comprising issuer and type of payment card received by a wireless beacon is received, via a communication module, when a payment card of the user connects to the wireless beacon at a merchant location. The payment card and the wireless beacon may connect using one of near field communication, Bluetooth communication, Bluetooth Low Energy (BLE) communication, WiFi communication, and LTE Direct communication. In various embodiments, the payment card may be implemented as a contactless smart card capable of transferring and receiving data using near field communications capability. In other embodiments, the wireless beacon may communicate with a user's mobile device and the mobile device may further communicate and connect to the payment card.

At step 404, merchant accepted payment source data may be accessed from a merchant server account module. In some embodiments, merchant payment source data may be accessed from a merchant server remote from merchant location. In other embodiments, merchant payment source data may be accessed from a server that is local to merchant location. In other embodiments, a payment provider server may be accessed for a merchant accepted payment source database from the payment provider database.

At step 406, the merchant accepted payment source data may be compared to the payment card data to determine a match. A match may be determined for a users' single card or a match may be determined for several of user's payment cards. Once it is determined a payment card is accepted, account module may further associate accepted payment source account benefits with the accepted payment card.

At step 408, the user may be alerted the payment card is accepted at the merchant location after it is determined there is a match. In one embodiment, the wireless beacon may alert the user by communication of a message to payment card to activate an LED contained on payment card to turn on. In another embodiment, wireless beacon may alert the user by communication of a message to payment card to activate an E-INK® display to display a message "accepted at XXX" where XXX identifies merchant location. Thus, user may be informed prior to entering merchant location payment card is an accepted form of payment.

In other embodiments, the user's payment card may include an RFID or similar passive device to receive certain frequency communications that are associated with a particular payment card/issuer. If a merchant's wireless beacon is programmed to continuously broadcast an "accepted card" at the certain frequency of a particular payment card/issuer, then when the user's payment card associated with the particular payment card/issuer is in range of the beacon set up at the merchant location, the card may respond by activating an LED contained on the payment card to turn on.

In yet another embodiment, the communication module may communicate with a user's mobile device when the user's device is detected in proximity of the merchant location by wireless beacon. The user's mobile device may communicate payment card issuer and type of payment card data to wireless beacon. After wireless beacon or merchant device communicates to user's device that payment card is accepted, user's device may communicate to payment card to initiate a response for example, by activating an LED. Incentives, rewards or other features may be used by the merchant server and payment provider server to suggest a preferred payment source from several of user's payment cards accepted at the merchant location. For example, from several of user's payment cards accepted at the merchant location, preference may be based on rewards offered by issuers of the payment cards or preference may be based on offers by merchants for certain card types. In this regard, the merchant location may accept rewards points associated with a particular payment card as credit toward the purchase of an item (e.g., American Express® card rewards points). Further, a merchant location may make special offers or discounts for certain card types. The preferred payment card information may be communicated to a merchant employee through a merchant device and upon user check out, the merchant employee may inform the user of the preferred payment card choice and special incentives (e.g., reward points redemption, etc.) offered by the payment card and/or merchant.

A merchant employee may be notified a user's payment card is accepted at the merchant location and a security code is included on those embodiments incorporating display technology. In this regard, the merchant employee may read the code on the display when the card is presented by the user upon check out to determine the payment card is valid.

Figure 5:
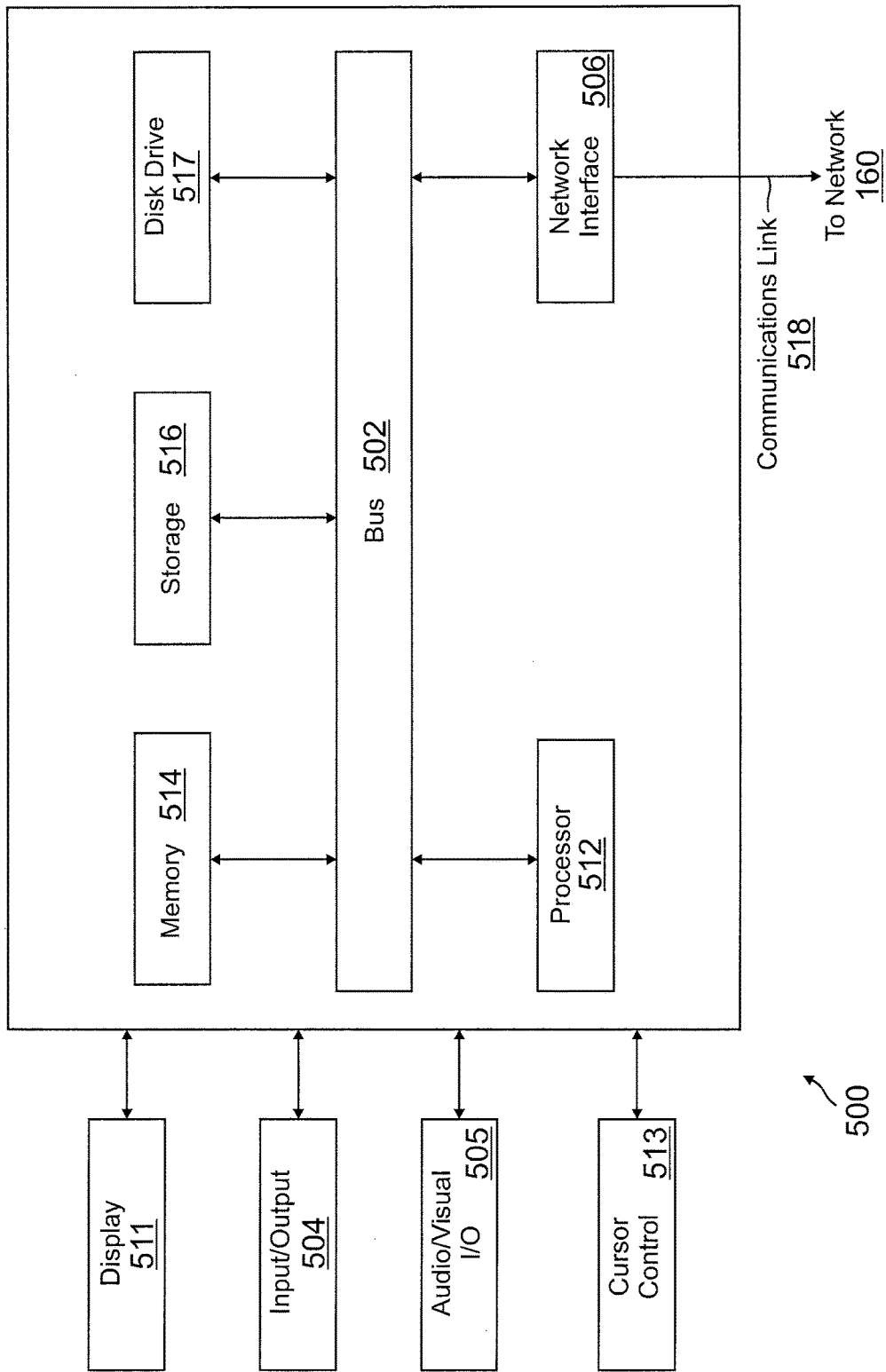
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the payment card may comprise a contactless smart card providing a controller, a memory and an antenna capable of transferring and receiving data using a near field communications capability for communication with wireless beacons or other wireless protocol devices (e.g., a smart phone). The merchant and/or payment service provider may utilize a network computing device (e.g., a network server) capable of communicating with the network. It should be appreciated that each of the devices utilized by users, merchants and payment service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
in response to a wireless beacon at a merchant location detecting a payment card in a first proximity range to the wireless beacon using short range communication signals, determining the merchant location;
receiving payment card data for the payment card from the wireless beacon;
accessing accepted payment sources data for a merchant device associated with the merchant location;
determining a match between the payment card and the accepted payment sources using the payment card data;
in response to the match, activating, using the wireless beacon, a visual output component of the payment card in possession of a user at the merchant location using the short range communication signals of the wireless beacon, wherein the visual output component comprises at least an light emitting diode (LED), and wherein the activating the visual output component comprises causing the LED to turn on;
generating a security code specific to the payment card and the merchant device, wherein the security code is required to be matched between the payment card and the merchant device for transaction processing using the payment card at the merchant location; and
communicating the security code to the payment card and the merchant device, wherein matching the security code between the payment card and the merchant device by the merchant device authenticates use of the payment card with the merchant device for the transaction processing when scanning the payment card by the merchant device.

2. The system of claim 1, wherein the payment card is a contactless smart payment card comprising a controller, a memory and an antenna.

3. The system of claim 1, wherein the short range communication signals comprise one of near field communication, Bluetooth communication, Bluetooth Low Energy (BLE) communication, Wireless Fidelity (WiFi) communication, or Long-Term Evolution (LTE) Direct communication.

4. The system of claim 1, wherein a mobile device connects to the wireless beacon and the payment card.

5. The system of claim 1, wherein the payment card data comprises at least one of a type of the payment card or a name of an issuer of the payment card.

6. The system of claim 1, wherein the LED indicates that the payment card is accepted at the merchant location.

7. The system of claim 1, wherein the activating the visual output component further comprises displaying a message on the visual output component contained on the payment card, and wherein the message indicates that the payment card is accepted at the merchant location.

8. The system of claim 7, wherein additional messages are communicated to the visual output component contained on the payment card, and wherein the additional messages comprises at least one of a security message associated with fraudulent use of the payment card or an advertising message for the merchant location.

9. The system of claim 1, wherein the payment card is recommended from a plurality of alerted payment cards through a message on the visual output component, and wherein the payment card is recommended based on a comparison of payment card rewards and merchant offers available on each of the plurality of alerted payment cards.

10. A method comprising:
in response to a wireless beacon at a merchant location detecting a payment card in a first proximity range to the wireless beacon using short range communication signals, determining the merchant location;
receiving, via a network interface component, payment card data for the payment card from the wireless beacon;
accessing, by account module comprising at least one hardware processor, accepted payment sources for a merchant device associated with the merchant location;
determining a match between the payment card and the accepted payment sources using the payment card data;
in response to the match, activating, using the wireless beacon, a visual output component of the payment card in possession of a user at the merchant location using the short range communication signals of the wireless beacon, wherein the visual output component comprises at least an light emitting diode (LED), and wherein the activating the visual output component comprises causing the LED to turn on;
generating a security code specific to the payment card and the merchant device, wherein the security code is required to be matched between the payment card and the merchant device for transaction processing using the payment card at the merchant location; and
communicating the security code to the payment card and the merchant device, wherein matching the security code between the payment card and the merchant device by the merchant device authenticates use of the payment card with the merchant device for the transaction processing when scanning the payment card by the merchant device.

11. The method of claim 10, wherein the security code further comprises a security message that is unique to the merchant location.

12. The method of claim 11, wherein the security message is further provided to the merchant device.

13. The method of claim 11, wherein the security message comprises a coded message alerting the merchant device that the payment card or a transaction is fraudulent if the payment card is unauthorized or reported as stolen.

14. The method of claim 10, wherein the accessing the accepted payment sources comprises accessing the accepted payment sources from at least one of a merchant server or a payment provider server.

15. The method of claim 10, wherein the LED indicates that the payment card is accepted at the merchant location.

16. The method of claim 10, wherein the activating the visual output component further comprises displaying a message on the visual output component contained on the payment card, and wherein the message indicates that the payment card is accepted at the merchant location.

17. The method of claim 16, wherein additional messages are communicated to the visual output component contained on the payment card, and wherein the additional messages comprises at least one of a security message associated with fraudulent use of the payment card or an advertising message for the merchant location.

18. The method of claim 10, wherein the wireless beacon at broadcasts at a certain frequency communication of a particular payment card issuer, and wherein the payment card responds to the certain frequency communication by activating an LED contained on the payment card.

19. The method of claim 10, wherein determining the match further comprises recommending the payment card from a plurality of accepted payment cards through a message communicated to the visual output component contained on the payment card, and wherein the payment card is recommended based on a comparison of payment card rewards and merchant offers available on each of the plurality of accepted payment cards.

20. A non-transitory machine-readable medium having stored thereon machine-readable instructions executable to cause a machine to perform operations comprising:
- in response to a wireless beacon at a merchant location detecting a payment card in a first proximity range to the wireless beacon using short range communication signals, determining the merchant location;
- receiving, via a network interface component, a payment card data from a wireless beacon;
- accessing, by account module comprising at least one hardware processor, accepted payment sources for a merchant device associated with the merchant location;
- determining a match between the payment card and the accepted payment sources using the payment card data;
- in response to the match, activating, using the wireless beacon, a visual output component of the payment card in possession of a user at the merchant location using the short range communication signals of the wireless beacon, wherein the visual output component comprises at least an light emitting diode (LED), and wherein the activating the visual output component comprises causing the LED to turn on;
- generating a security code specific to the payment card and the merchant device, wherein the security code is required to be matched between the payment card and the merchant device for transaction processing using the payment card at the merchant location; and
- communicating the security code to the payment card and the merchant, wherein matching the security code between the payment card and the merchant device by the merchant device authenticates use of the payment card with the merchant device for the transaction processing when scanning the payment card by the merchant device.

* * * * *